United States Patent
Huang et al.

(10) Patent No.: US 10,899,628 B2
(45) Date of Patent: Jan. 26, 2021

(54) CERIUM SULFATE CHELATED SULFUR DIOXIDE, A PREPARATION METHOD AND A USE THEREOF

(71) Applicant: South China Normal University, Guangzhou (CN)

(72) Inventors: Ruqiang Huang, Guangzhou (CN); Qian Wang, Guangzhou (CN); Guanghua Wang, Guangzhou (CN); Jinghui Wang, Guangzhou (CN); Linlin Gao, Guangzhou (CN); Jingwen Zhang, Guangzhou (CN)

(73) Assignee: SOUTH CHINA NORMAL UNIVERSITY, Guangzhou (CN)

( * ) Notice: Subject to any disclaimer, the term of this patent is extended or adjusted under 35 U.S.C. 154(b) by 107 days.

(21) Appl. No.: 16/094,939

(22) PCT Filed: Mar. 15, 2018

(86) PCT No.: PCT/CN2018/079101
§ 371 (c)(1),
(2) Date: Oct. 22, 2018

(87) PCT Pub. No.: WO2019/100626
PCT Pub. Date: May 31, 2019

(65) Prior Publication Data
US 2019/0185336 A1    Jun. 20, 2019

(30) Foreign Application Priority Data
Nov. 27, 2017    (CN) .......................... 2017 1 1201673

(51) Int. Cl.
*C01F 17/282*    (2020.01)
*G01N 31/00*    (2006.01)

(52) U.S. Cl.
CPC .......... *C01F 17/282* (2020.01); *G01N 31/00* (2013.01); *C01P 2002/76* (2013.01);
(Continued)

(58) Field of Classification Search
None
See application file for complete search history.

(56) References Cited

U.S. PATENT DOCUMENTS

2006/0269462 A1\* 11/2006 Vartuli ................... B01J 23/002
                                                                      423/263
2015/0380760 A1\* 12/2015 Spaziante ............. H01M 8/188
                                                                      429/105

FOREIGN PATENT DOCUMENTS

CN           001071144    \*    4/1993

\* cited by examiner

Primary Examiner — Sheng H Davis
(74) Attorney, Agent, or Firm — Fishman Stewart PLLC

(57) ABSTRACT

The disclosure discloses cerium sulfate chelated sulfur dioxide, a preparation method and a use thereof. The cerium sulfate chelated sulfur dioxide has a molecular formula of Ce[SO4][SO2].2H2O. It is a white crystal and the preparation method thereof may comprise the following steps: adding anhydrous cerium sulfate to dilute sulfuric acid with stirring for dissolvation; adding a solvent followed by refluxing at 45-50° C. for 2.0-2.5 h; heating the reaction product to remove the solvent, cooling to 20° C. or lower, and adding dilute sulfuric acid to allow precipitation of all crystals; cooling down the product followed by suction filtration, washing the obtained crystals by the solvent, so that crude cerium sulfate chelated sulfur dioxide can be obtained. The solubility of the cerium sulfate chelated sulfur dioxide of the disclosure has been significantly improved compared to the anhydrous cerium sulfate. The obtained solution is colorless and transparent, so that the cerium
(Continued)

sulfate chelated sulfur dioxide can be used as a better titrant with wide application and supreme performance.

15 Claims, 2 Drawing Sheets

(52) U.S. Cl.
CPC ...... *C01P 2002/77* (2013.01); *C01P 2002/82* (2013.01); *C01P 2002/88* (2013.01)

CERIUM SULFATE CHELATED SULFUR DIOXIDE, A PREPARATION METHOD AND A USE THEREOF

CROSS-REFERENCE TO RELATED APPLICATIONS

This application claims priority to China Patent Application No. CN 201711201673.3 filed Nov. 27, 2017, and International Patent Application No. PCT/CN2018/079101 filed Mar. 15, 2018, both of which are hereby incorporated by reference in their entirety.

TECHNICAL FIELD

The disclosure belongs to the field of rare earth element compounds, and particularly relates to cerium sulfate chelated sulfur dioxide, a preparation method and a use thereof.

BACKGROUND OF THE DISCLOSURE

The positive tetravalent cerium ion in anhydrous cerium sulfate ($Ce(SO_4)_2$) can oxidize the titrated compound from a low-valent state to a high-valent state. Therefore, anhydrous cerium sulfate can be used as a titrant to determine the content of some reducing substances. For example, it can be used to titrate titanium (III) and iron (II), determine the content of titanium dioxide and total iron in ilmenite, or use methylene blue-methyl orange as an indicator to determine the strontium content in gold concentrate by cerium sulfate titration.

Anhydrous cerium sulfate is a strong oxidizing agent. It is not highly soluble in water, but highly soluble in a solution of a certain acidity. Therefore, when preparing a standard solution of cerium sulfate, it is necessary to add a certain concentration of dilute sulfuric acid with heating and stirring, or add concentrate sulfuric acid to dissolve it. During addition of concentrate sulfuric acid, a large amount of heat is generated, and the anhydrous cerium sulfate tends to be toxic when heated at a high temperature. Also, the color of the obtained solution is orange-yellow, which will cause certain interference to the color change at the end point of the titration. Therefore, it would be helpful to provide a positive tetravalent cerium ion compound which is colorless and soluble in water without adding sulfuric acid.

SUMMARY OF THE DISCLOSURE

An object of the present disclosure is to provide a new compound, cerium sulfate chelated sulfur dioxide.

Another object of the present disclosure is to provide a process for preparing the cerium sulfate chelated sulfur dioxide.

A further object of the disclosure is to provide the use of the cerium sulfate chelated sulfur dioxide.

The objects of the disclosure are achieved by the following technical solution:

Cerium sulfate chelated sulfur dioxide, which has a molecular formula of $Ce[SO_4][SO_2]\cdot 2H_2O$ and is a white crystal with a structure as shown in formula I;

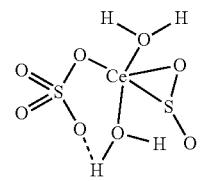

A preparation method of cerium sulfate chelated sulfur dioxide, may comprise the following steps:

adding anhydrous cerium sulfate to dilute sulfuric acid with stirring for dissolvation; adding a solvent followed by refluxing at about 45-50° C. for about 2.0-2.5 h; heating the reaction product to remove the solvent, cooling to about 20° C. or lower, and adding dilute sulfuric acid to allow precipitation of all crystals; cooling down the product followed by suction filtration, washing the obtained crystals by the solvent, so that crude cerium sulfate chelated sulfur dioxide can be obtained;

adding dilute sulfuric acid to the crude cerium sulfate chelated sulfur dioxide for recrystallization, then cooling down the product followed by suction filtration, and drying the product under vacuum to obtain a pure cerium sulfate chelated sulfur dioxide crystallized product;

wherein the dilute sulfuric acid may be diluted from concentrated sulfuric acid to about 30% by mass sulfuric acid aqueous solution; the mass ratio of the anhydrous cerium sulfate to the concentrated sulfuric acid is about 1:2 to 1:3;

the said heating the reaction product to remove the solvent is by rotary evaporation at about 60° C.;

the solvent may be methanol;

the said drying the product under vacuum is carried out at about 45° C.

The cerium sulfate chelated sulfur dioxide of the disclosure forms an emulsion with water, and can dissolve after standing for a period of time or heating under water bath of about 45 to 50° C.; it is soluble in about 4% aqueous solution of dimethyl sulfoxide (DMSO), but insoluble in DMSO.

The cerium sulfate chelated sulfur dioxide of the present disclosure can be used as a titrant. Cerium sulfate chelated sulfur dioxide is a kind of cerium salt, which can be used as a titrant to determine the content of titanium (III), iron (II) and antimony. The positive tetravalent cerium ion will be oxidized from a low-valence state to a high-valence state. It can be dissolved in water with heating, and the solution is colorless, so that the end point of the titration reaction is clear, sharp and easy to judge.

The present disclosure has the following advantages and effects over the prior art:

The new compound of the present disclosure, cerium sulfate chelated sulfur dioxide, can be dissolved in water with heating, and the color of the solution is colorless and transparent. When it is used as a titrant, it is not necessary to add dilute sulfuric acid or concentrated sulfuric acid, thereby reducing experiment steps and avoiding the appearance of toxic substance produced by cerium salt under high temperature. When being used as a titrant, it can make the end point of the titration reaction clear, sharp and easy to judge.

DETAILED DESCRIPTION OF THE EMBODIMENTS

The present disclosure will be further described in detail below with reference to the embodiment and drawings, but the embodiment of the present disclosure is not limited thereto.

An exemplary preparation method of cerium sulfate chelated sulfur dioxide is as follows:

(1) adding 90 mL of dilute sulfuric acid (30% by mass, the same below) to a dry 250 mL three-necked flask equipped with a thermometer, a water separator, and a reflux condenser;

(2) adding 0.3 g of anhydrous cerium sulfate to the solution obtained in step (1) through the water separator, and then performing electromagnetic stirring with a stirring intensity of 50 r/min until the anhydrous cerium sulfate is completely dissolved, and the temperature reaches room temperature;

(3) adding 90 mL of methanol to the solution obtained in step (2);

(4) performing electromagnetic stirring on the solution obtained in step (3) with a stirring intensity of 300 r/min, and then refluxing to extract for 2 h at 60° C., wherein the extraction period is counted from the time when condensate appears;

(5) pouring the reaction solution obtained in step (4) into a 500 mL round bottom flask, and concentrating it by a rotary evaporator at 60° C. to a volume of 90 mL;

(6) pouring the reaction solution obtained in step (5) into a 250 mL beaker, and after cooling to 20° C., adding dilute sulfuric acid for multiple times, and continuously stirring with a glass rod to precipitate all the crystals;

(7) cooling down and suction filtering the solution obtained in step (6), so that after washing with methanol, crude cerium sulfate chelated sulfur dioxide crystal is obtained;

(8) adding dilute sulfuric acid to the crude product for recrystallization for several times with stirring continuously by a glass rod, followed by cooling and suction filtration;

(9) drying the crystal obtained in step (8) under vacuum at 45° C. to obtain pure cerium sulfate chelated sulfur dioxide.

Figure 1:
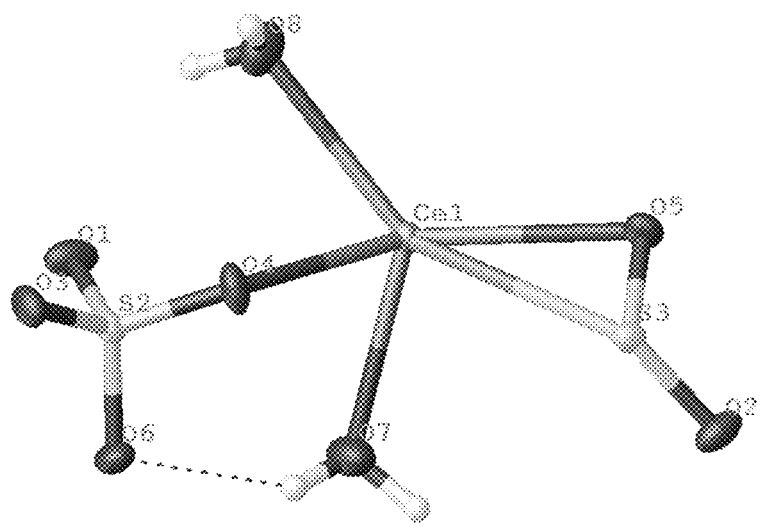
FIG. 1 shows the molecular structure of cerium sulfate chelated sulfur dioxide of the present disclosure.

The new compound obtained by the above method, cerium sulfate chelated sulfur dioxide, is a white crystal. As shown in FIG. 1, the molecular formula of cerium sulfate chelated sulphur dioxide is $Ce[SO_4][SO_2]\cdot 2H_2O$, and the crystal system of which is monoclinic. It belongs to P 21/n space group with unit cell parameter a=15.692 (3) nm, b=9.6145 (19) nm, c=10.341 (2) nm, $\alpha$=90°, $\beta$=119.76°, $\gamma$=90°, Z=16, Z'=2.000, V=1354.3(6), GOOF=1.141. The asymmetric structural unit of the compound contains 10 non-hydrogen atoms, 10 of which are skeleton atoms (1 Ce, two S atoms, 7 oxygen atoms); Ce1 atom coordinates with 2 water molecules, the oxygen of $S2O_4$ and $S3O_2$, and the S atom of S3O2, wherein the bond length of Ce1-O7 is 2.548(7), the bond length of Ce1-O8 is 2.618(7), the bond length of Ce1-O4 is 2.455(6), the bond length of Ce1-O5 is 2.801(6), the bond length of Ce1-S3 is 3.286(8), the bond angle of O4-Ce1-O7 is 74.3(2)°, the bond angle of O4-Ce1-O8 is 72.4. (2)°, the bond angle of O7-Ce1-S3 is 89.39 (18)°, and the bond angle of S3-Ce1-O5 is 26.41 (12)°. The sulfate ion has an oxygen atom coordinating with metal cerium. The $S2O_4$ tetrahedron is chelated through O4 with the Ce1 atom. The bond length of [S2-O4 is 1.477(6), the bond length of S2-O1 is 1.459(6), the bond length of S2-O6 is 1.471(6)], the bond angle of O4-S2-O6 is 108.9(4)°, the bond angle of O4-S2-O1 is 108.8(4)°, and the bond angle of O1-S2-O3 is 109.6 (4)°, wherein O1 atom is a terminal oxygen with S=O bond length of 1.459 (6) nm, and the SO4 exhibits a slightly distorted tetrahedral configuration according to the bond length and bond angle thereof. $S3O_2$ is chelated with the Ce1 atom through O5 and S3, wherein the bond length of S3-O5 is 1.469 (6), the bond length of S3-O2 is 1.468 (6), and the bond angle of O2-S3-O5 is 110.8(4)°. The bond angle of Ce1-O5-S3 is 95.5(3)°, and the bond angle of Ce1-S3-O2 is 126.7(3)°. The bond length and bond angle of the two water molecules coordinated with the Ce1 atom are shown below: the bond length of O7-H7B is 0.9237, the bond length of O7-H7A is 0.9217, the bond length of O8-H8A is 0.8534, the bond length of O8-H8B is 0.8533, the bond angle of H7A-O7-H7B is 105.9°, and the bond angle of H8A-O7-H8B is 109.3°.

The skeleton structure of the compound is composed of a Ce atom coordinated with a $SO_4$ tetrahedron, a $SO_2$ and two water molecules, wherein a large amount of hydrogen bonds form among the coordinated water molecules, among the coordinated water molecules, the interlayer water molecules and the oxygen atoms, and among the interlayer water molecules. The adjacent inorganic layers are connected to each other by hydrogen bonds to form a three-dimensional structure.

Figure 2:
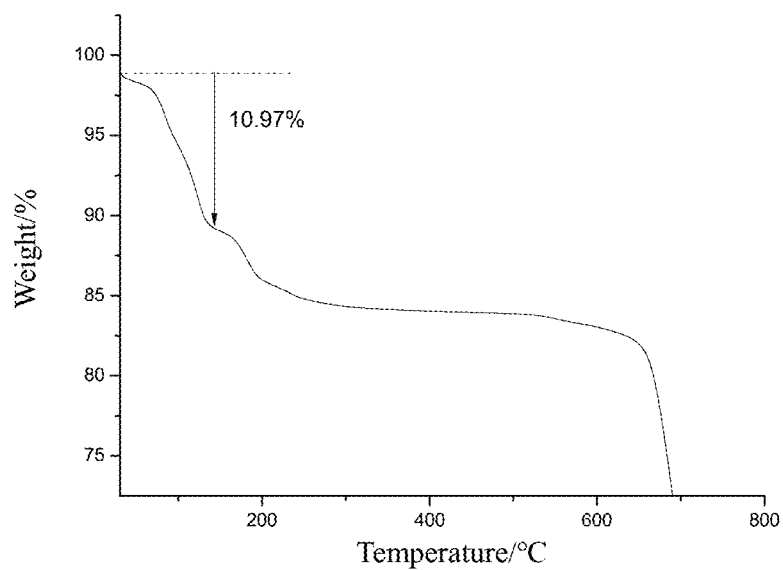
FIG. 2 is a thermogravimetric analysis diagram of cerium sulfate chelated sulfur dioxide of the present disclosure.

The thermogravimetric analysis result of cerium sulfate chelated sulfur dioxide is shown in FIG. 2. It is known from the TGA curve that the weight loss between 30.5° C. and 150° C. corresponds to the content of crystal water in the chelated molecules. The weight loss of cerium sulfate chelated sulfate ion is 11%, which is consistent with the loss of 2 mol of crystal water obtained by X-ray diffraction analysis; the result of thermogravimetric analysis shows that 72.51% of the product is remained in the final residue, indicating the strong thermal stability of the product.

Figure 3:
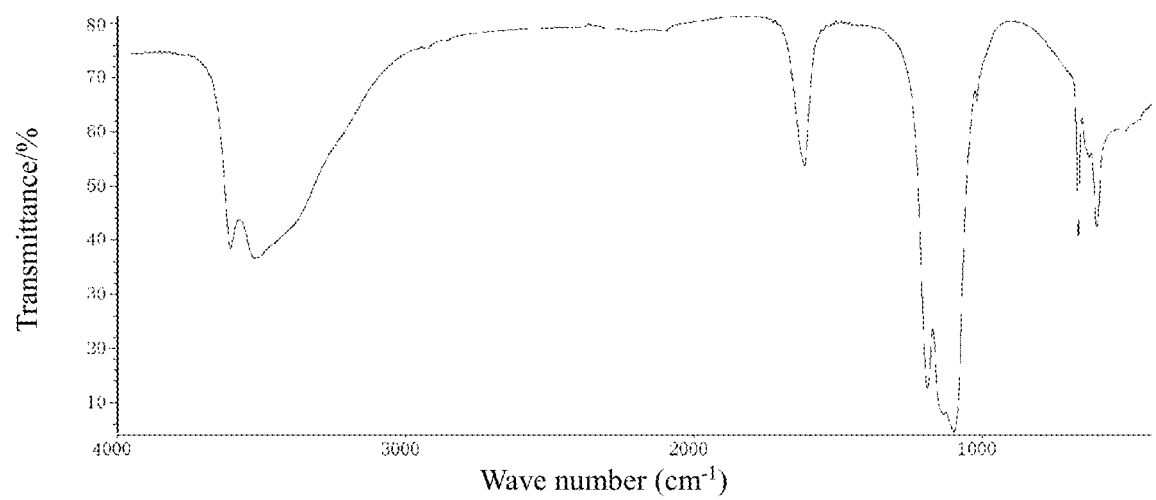
FIG. 3 is an IR spectrum of cerium sulfate chelated sulfur dioxide of the present disclosure.

The IR spectrum of cerium sulfate chelated sulfur dioxide is shown in FIG. 3. The absorption band of 3660 $cm^{-1}$ belongs to the stretching vibration absorption of O—H group, the stretching vibration band of water is at 3610 $cm^{-1}$, the stretching vibration band of S=O group is at 1040 $cm^{-1}$-1220 $cm^{-1}$, and the vibration absorption band of SO2-4 are at 656 $cm^{-1}$ and 588 $cm^{-1}$.

Use cerium sulfate chelated sulfur dioxide to determine iron content:

Cerium sulfate chelated sulfur dioxide standard solution: 0.05 mol/L, take 16.8 g $Ce[SO_4][SO_2]\cdot 2H_2O$, dissolve it in water to prepare a 1000 mL solution with heating, and standardize the solution with pure iron after standing for 24 h;

Iron standard solution: 1 g/L, take 0.2 g pure iron (mass fraction of 99.99%), add 8 mL of 50% HCl, dilute the solution to 200 mL with water after dissolvation, and shake the solution for homogenization;

Ascorbic acid (VC) solution: 100 g/L, take 10 g ascorbic acid, make up to 100 mL with water and use immediately;

Sulfuric-phosphoric mixed acid: slowly add 150 mL concentrated $H_2SO_4$ to 700 mL water, and add 150 mL concentrated $H_3PO_4$ with mixing after cooling down;

Sodium diphenylamine sulfonate solution: 2 g/L, take 0.1 g sodium diphenylamine sulfonate, make up to 50 mL with water;

Methylene blue solution: 0.5 g/L, take 25 mg of methyl blue, dissolve it in a small amount of water, and then gradually add more water to 50 ml.

Take 40 mL iron standard solution in an Erlenmeyer flask, add 3 mL 50% HCl and add VC until the solution is pale yellow. Then add 9-10 drops of methyl blue and continue to add VC. When the blue color fades, add 2 mL more VC, let the solution stand for 3 min, and use the cerium sulfate chelated sulfur dioxide standard solution to titrate it until blue color appears. After that, add 40 mL water, 30 mL sulfuric-phosphoric mixed acid, 9-10 drops of diphenylamine sulfonate, and continue to titrate with cerium sulfate chelated sulfur dioxide standard solution until purple red color appears, which indicates the end point. The iron content is calculated from the volume of the cerium sulfate chelated sulfur dioxide standard solution consumed during the second titration.

The above described embodiment is preferred embodiment of the present disclosure, but the embodiment of the present disclosure is not limited to the above described embodiment. Any other changes, modifications, substitutions, combinations, and simplifications made without departing from the spirit and scope of the disclosure should be equivalent replacements and be included in the scope of the present disclosure.

What is claimed is:

1. A preparation method of cerium sulfate chelated sulfur dioxide, characterized in that it comprises the following steps:
   adding anhydrous cerium sulfate to dilute sulfuric acid with stirring for dissolvation, adding a solvent followed by refluxing at 45-50° C. for 2.0-2.5 h, heating the reaction product to remove the solvent, cooling to 20° C. or lower, and adding dilute sulfuric acid to allow precipitation of all crystals, cooling down the product followed by suction filtration, washing the obtained crystals by the solvent, so that the crude cerium sulfate chelated sulfur dioxide can be obtained.

2. The preparation method of cerium sulfate chelated sulfur dioxide as claimed in claim 1, characterized in that it further comprises adding dilute sulfuric acid to the crude cerium sulfate chelated sulfur dioxide for recrystallization, then cooling down the product followed by suction filtration, and drying the product under vacuum to obtain a pure cerium sulfate chelated sulfur dioxide crystallized product.

3. The preparation of cerium sulfate chelated sulfur dioxide as claimed in claim 1, the solvent is methanol.

4. The preparation method of cerium sulfate chelated sulfur oxide as claimed in claim 1, characterized in that the dilute sulfuric acid is diluted from concentrated sulfuric acid to a 30% by mass sulfuric acid aqueous solution.

5. The preparation method of cerium sulfate chelated sulfur dioxide as claimed in claim 1, characterized in that a mass ratio of the anhydrous cerium sulfate to the concentrated sulfuric acid is 1:2 to 1:3.

6. The preparation method of cerium sulfate chelated sulfur dioxide as claimed in claim 2, characterized in that the dilute sulfuric acid is diluted from concentrated sulfuric acid to a 30% by mass sulfuric acid aqueous solution.

7. A method of preparing cerium sulfate chelated sulfur dioxide comprising:
   adding anhydrous cerium sulfate to dilute sulfuric acid;
   adding a solvent followed by refluxing at a predetermined temperature for a predetermined period;
   heating a reaction product to remove the solvent, then cooling to about 20° C.;
   adding dilute sulfuric acid to allow precipitation of crystals;
   cooling down the product;
   inducing suction, filtration; and
   washing the crystals by the solvent to create crude cerium sulfate chelated sulfur oxide.

8. The method as claimed in claim 7, wherein the predetermined temperature is about 45° C.-50° C.

9. The method as claim in claim 7, wherein the predetermined period is about 2.0 hours to 2.5 hours.

10. The method as claimed in claim 7, further comprising:
    adding dilute sulfuric acid to the crude cerium sulfate chelated sulfur dioxide for recrystallization;
    cooling the product followed by suction filtration; and
    drying the product under vacuum to obtain a pure cerium sulfate chelated sulfur dioxide crystallized product.

11. The method as claimed in claim 7, wherein the solvent is methanol.

12. The method as claimed in claim 7, wherein the dilute sulfuric acid is diluted from concentrated sulfuric acid to about 30% by mass sulfuric acid aqueous solution.

13. The method as claimed in claim 7, wherein a mass ratio of the anhydrous cerium sulfate to the concentrated sulfuric acid is about 1:2 to 1:3.

14. The method as claimed in claim 7, wherein the cerium sulfate chelated sulfur dioxide is used as a titrant in determining the content of titanium, iron or antimony.

15. The method as claimed in claim 7, wherein the cerium sulfate chelated sulfur dioxide is a white crystal.

* * * * *